March 8, 1932. E. R. GODWARD 1,848,620
MEANS FOR VAPORIZING FUEL MIXTURES
Filed April 11, 1930
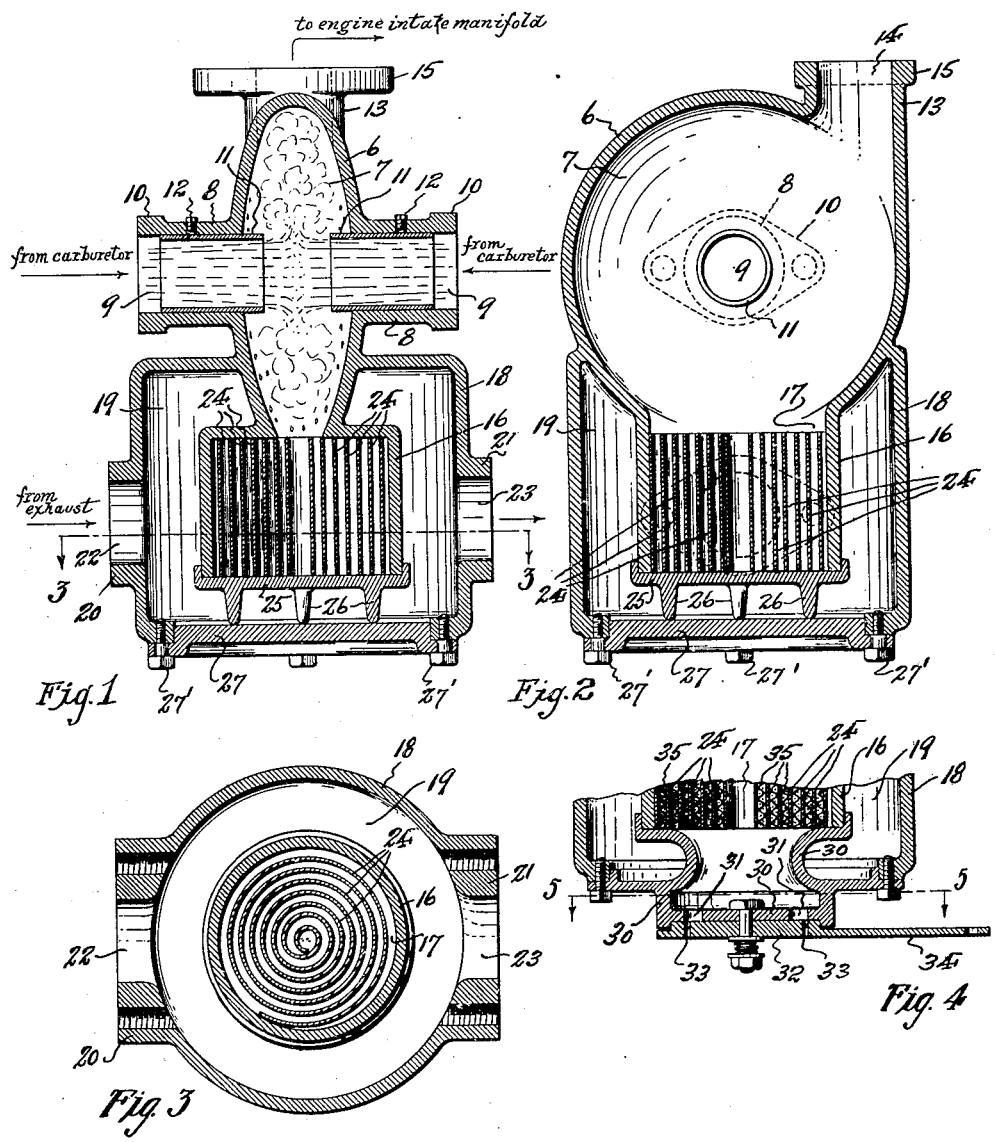
INVENTOR.
Ernest R. Godward,
BY
George D. Richards
ATTORNEY.

Patented Mar. 8, 1932

1,848,620

UNITED STATES PATENT OFFICE

ERNEST R. GODWARD, OF NEW YORK, N. Y., ASSIGNOR TO THE ECLIPSE PETROL ECONOMISER SYSTEM COMPANY, LIMITED, OF CHRISTCHURCH, NEW ZEALAND, A CORPORATION OF NEW ZEALAND

MEANS FOR VAPORIZING FUEL MIXTURES

Application filed April 11, 1930. Serial No. 443,417.

This invention relates to an improved means for vaporiizng fuel mixtures such e. g. as those supplied to internal combustion engines; and this invention has reference more particularly to a novel method and means for breaking up and vaporizing the liquid fuel content of atomized fuel mixtures delivered from ordinary carburetors.

It is well known that atomized fuel mixtures produced by ordinary carburetors are delivered from the latter in the form of wet vapor or fog which contains a multiplicity of liquid fuel particles, some of which are of substantial size. It is also recognized that the more finely the liquid fuel is divided or broken up and mingled with air, the more efficient is the resultant fuel mixture, since the more nearly the same approaches the ideal completely vaporized condition which is the desideratum. With such desideratum in view, this invention has for its principal object to provide a novel method and means for further treating an atomized fuel mixture obtained by any well known method of carburetion so that the particles of liquid fuel contained therein are further broken up, and so that any relatively large particles of liquid fuel still remaining therein are temporarily removed from the mixture for separate treatment calculated to effect the vaporization thereof before return to the mixture and delivery to the cylinders of an internal combustion engine to which the fuel mixture is to be supplied. To such end, I propose to divide or split the amount of fuel mixture charge, necessary to the internal combustion engine to be served, into two distinct streams (derived from one, two or more carburetors), and to oppositely direct the two streams one toward the other while moving at equal velocity, whereby the same will forcibly collide in impingement one upon the other, with tendency to further shatter or break up the particles of liquid fuel contained therein. The fuel mixture streams on thus striking each other head on, will tend to fan out radially and laterally relative to the axis of the meeting streams, thus forming a disc-like body of vapor; while the relatively heavy particles of liquid fuel will, on impingement of the opposed streams, if not shattered, be slowed up sufficiently to permit of their gravitation to and upon surfaces down which they may run to a heated means adapted to vaporize the same for return to the fuel mixture discharged to the internal combustion engine cylinders.

In addition to the object above outlined, this invention has for a further object to provide a novel means for directing and controlling opposed fuel mixture streams for desired mutual collision prior to delivery to the cylinders of an internal combustion engine, together with means for receiving and supporting wet fuel particles temporarily withdrawn from the fuel mixture streams subject to heat vaporization effects prior to delivery to the engine cylinders.

Other objects of this invention, not at this time more particularly enumerated, will be understood from the following detailed description of the same.

An illustrative embodiment of an apparatus for the purposes described and made according to the principles of this invention is shown in the accompanying drawings, in which:—

Fig. 1 is a vertical longitudinal section of a vaporizing device according to this invention; Fig. 2 is a vertical longitudinal section of the same in a plane at right angles to that of Fig. 1; Fig. 3 is a horizontal section on line 3—3 in Fig. 1; Fig. 4 is a fragmentary vertical section, similar to that of Fig. 2, but showing a modified arrangement, including an auxiliary air admission means in association with the heated vaporizer pot; and Fig. 5 is a horizontal section, taken on line 5—5 in Fig. 4.

Similar characters of reference are employed in the above-described views to indicate corresponding parts.

Referring to the drawings, the reference character 6 indicates the casing of a transverse collision or atomizing chamber 7 having centrally located at its opposite sides tubular necks 8 providing oppositely entering intake passages 9. Said necks 8 have flanged portions 10 at their free ends for the connection therewith of suitable conduits arranged to deliver an ordinary liquid fuel and air mixture from suitable carburetor means (not shown). In practice, it is preferable to employ two carburetors connected respectively with the opposed intake passages 9, although a single carburetor device may be employed having its fuel mixture delivery conduit divided or branched to provide and deliver the fuel mixture charges in two streams for opposite admission to the collision chamber 7. The carburetor device or devices are so adjusted relatively as to discharge to the collision chamber 7 fuel mixture streams of equal volume and velocity. Arranged within said necks 8 are longitudinally adjustable sleeves or nozzles 11, the inner free ends of which may be adjusted toward or away from each other within the collision or atomizing chamber to best advantage in causing the oppositely entering streams of fuel mixture to collide head-on within said collision or atomizing chamber. Said sleeves or nozzles 11 may be fixed in desired adjusted position by set-screws 12, or any other suitable form of fastening or fixing means.

Extending outwardly from the periphery of said collision or atomizing chamber is a neck portion 13 providing an outlet passage 14 for connection with the intake manifold (not shown) of an internal combustion engine or the like. Said neck-portion 13 is provided with a flanged free end 15 to couple with said engine intake manifold.

Connected with the lower side of said casing 6 is a vaporizer pot 16 to form a vaporizer chamber 17 which communicates with the interior of said collision or atomizing chamber 7. Formed in connection with said casing 6, and concentrically surrounding said vaporizer pot 16, is an external jacket casing 18 spaced from the sides and bottom of said vaporizer pot 16 so as to provide a surrounding heating chamber 19. Said jacket casing 18 is provided, preferably at opposite sides respectively, with a neck 20 and a neck 21. Said neck 20 providing an intake passage 22 for the admission of a heating fluid, such as exhaust gas from an internal combustion engine, and the neck 21 providing a discharge passage 23 for said heating fluid.

The lower end of the vaporizer pot 16 is open, whereby a plate surface coil 24 may be inserted therein. When the coil 24 is in place, the open bottom of the vaporizer pot 16 is closed by a bottom plate 25 having depending studs or fingers 26. The lower open end of said heating chamber 19 is closed by a cover-plate 27 secured in place by bolts 27'. The studs or fingers 26 impinge upon said cover-plate 27, thus holding the parts in assembled relation, and so that the heat of the hot fluid circulated in the heating chamber may be conducted through the bottom plate for upward conduction through plate surface coil 24.

The plate surface coil 24 may be variously made so as to provide a considerable area of vertically standing surface upon which wet fuel may be deposited for subjection to the vaporizing effect of heat upwardly conducted thereby, under the general principles disclosed e. g. in previously issued Letters Patent heretofore granted to me, viz. U. S. Patent #1,686,610, dated Oct. 9th, 1928, and U. S. Patent #1,686,611, dated Oct. 9th, 1928.

The fuel mixture streams, drawn from suitable carburetor means under the suction effects of internal combustion engine operation, are caused to enter at opposite sides of the casing 6 into the collision or atomizing chamber 7 so that opposed streams will meet in head-on collision within the latter, thus causing liquid fuel particles carried in the mixture to impinge or collide with considerable force, whereby the same are further shattered, broken up or more finely atomized to form a fog or vapor. The meeting streams of fuel mixture on such collision will spread out fan-wise into fog-like vapor of disc-like formation, the shape and position of the casing 6 and chamber 7 allowing such action. The highly atomized fuel mixture thus produced will thereupon be drawn off through the outlet passage 14, and thence through the engine intake manifold into the cylinders of the engine in the usual manner.

The collision of the meeting fuel mixture streams within the chamber 7, as above described, has the tendency to slow up the charge sufficiently so that some of the relatively large particles or drops of liquid fuel, which are suspended in the fuel mixture, and which may escape shattering under the colliding effects of the streams, are subjected to gravitational force so that the same may fall down directly onto the plate surfaces of the coil within the vaporizer pot, or upon the walls of the collision chamber 7 so as to run down the latter into said vaporizer pot. Furthermore, as the meeting streams fan out through the interior of the collision chamber, the vapor will impinge upon the side walls of the latter thereby tending to deposit relatively large particles of liquid fuel on such surfaces, thus producing a wet film of unvaporized fuel upon such wall surfaces, which will run down the same, since such film is more or less out of the direct line of suction by which the charge is moved to the engine cylinders, and since the velocity of the charge as such points is not sufficient to dislodge or drag the thus deposited film into the engine intake manifold. As the liquid fuel thus deposited runs down the wall surfaces it moves toward the heated vaporizer pot, whereby it is subjected to the vaporizing effects of the heat applied thereto.

It will be noted that the film of liquid fuel on its journey down the wall surfaces of the casing 6, is traveling in a direction opposite to the main flow of the charge being drawn into the engine, and that it travels towards the heated zone of the device and the vaporizing coil contained therein, thereby gradually heating the film on its way down so that the casing wall surfaces on which the liquid fuel spreads, as well as the surfaces of the plate coil 24 reached by the liquid fuel, provides a time factor or delay of the liquid fuel adequate to allow the gradual heating up of the same until such degree of heat is attained as will vaporize the same. Upon vaporization of the thus treated liquid fuel, the resultant vapor will be drawn back into the charge for delivery to the engine cylinders.

Variations of the method of fuel mixture treatment within the scope of this invention may be made. For example, feed of liquid fuel and air mixture may be carried in a stream entered into the collision chamber in opposition to an oppositely entering stream of air only; or two types of carbureted fuel mixtures may be utilized, whereby one entering stream may consist in fuel oil and the other gasoline, or either fuel oil or gasoline in one stream and alcohol in the other, for notwithstanding that the latter fuels do not readily mix in liquid form, yet they will readily mix in a vaporized or gaseous form produced by the vaporizing effects above recited.

From the above description it will be apparent that a novel method of atomizing with resultant vaporizing effect is obtained by the instant invention, wherein opposed fuel mixture streams are brought more or less violently together, so that in addition to the shattering effect thus exerted upon many of the liquid particles in suspension in the mixture, there is a momentary yet distinct slowing up or stopping of the fuel charge, whereby any large particles or drops of liquid fuel remaining may fall out of the charge and either directly or indirectly into the hot evaporating chamber provided for further gasifying treatment thereof.

A modification of the vaporizer pot element of the device is shown in Figs. 4 and 5, wherein instead of providing the bottom of the vaporizer pot 16 with a closed bottom, the same is provided with an adjustable air admission means, comprising an air admission member 30 having valve ports 31, and a movable valve plate 32 having valve ports 33 of such shape as to gradually open the valve ports 31, when moved into alignment therewith, to the desired degree or to close the same as the case may be. The valve plate 32 may be rotatably related to the fixed plate 30, and a lever extension 34 may be connected with the former for actuating the same. By this arrangement a controlled amount or volume of air could be admitted at certain engine speeds. The amount of air thus admitted should be merely sufficient to aid in carrying up the vaporized liquid fuel produced and delivered from the surface of the coil 24 in the vaporizer pot, and not sufficient to unduly impede the gravitation of liquid fuel to the vaporizer pot. If desired, strips of wire gauze 35 may be inserted between the convolutions of the coil plate 24, to restrain the admitted air against undue upward velocity, as well as to afford additional support for liquid fuel.

Having thus described my present invention, I claim:—

1. A device for vaporizing atomized carburetted fuel mixtures comprising, an annular transverse narrow chamber having intake passages at opposite sides thereof for the admission of fuel mixture streams in opposition one to another for mutual colliding effect within said chamber whereby liquid fuel particles suspended in said streams are further shattered and the vapor of said impacting streams cause to fan out transversely therefrom toward the periphery of said chamber, a discharge passage communicating with the periphery of said chamber for delivering the mixture vapor from the device, a vaporizer pot connected with the lower side of said chamber and communicating therewith, and means for heating said pot whereby relatively large liquid fuel particles removed from said impacting mixture streams and collected by gravitation in said pot are subjected to vaporizing heat and when thus vaporized returned to the mixture vapor discharging from said chamber.

2. A device for vaporizing atomized carburetted fuel mixtures comprising, an annular transverse narrow relatively cool chamber having intake passages at opposite sides thereof for the admission of fuel mixture streams in opposition one to another for mutual colliding effect within said chamber whereby liquid fuel particles suspended in said streams are further shattered and the vapor of said impacting streams caused to fan out transversely therefrom toward the periphery of said chamber, a discharge passage communicating with the periphery of said chamber for delivering the mixture vapor from the device, a vaporizer pot connected with the lower side of said chamber and communicating therewith, means providing a considerable area of upstanding plate surface within said pot whereby relatively large liquid fuel particles removed from said impacting mixture streams may gravitate from said cool chamber to collect upon said plate surface, and means for heating said pot and the contained plate surface means therein.

3. A device for vaporizing atomized carburetted fuel mixtures comprising, an annular transverse narrow, relatively cool chamber having intake passages at opposite sides thereof for the admission of fuel mixture streams in opposition one to another for mutual colliding effect within said chamber whereby liquid fuel particles suspended in said streams are further shattered and the vapor of said impacting streams caused to fan out transversely therefrom toward the periphery of said chamber, a discharge passage communicating with the periphery of said chamber for delivering the mixture vapor from the device, a vaporizer pot connected with the lower side of said chamber and communicating therewith, means providing a considerable area of upstanding plate surface within said pot whereby relatively large liquid fuel particles removed from said impacting mixture streams may gravitate from said cool chamber to collect upon said plate surface, means for heating said pot and the contained plate surface means therein, and means for admitting a controlled amount of air for upward movement through said vaporizer pot.

In testimony that I claim the invention set forth above I have hereunto set my hand this 7th day of April, 1930.

ERNEST R. GODWARD.